United States Patent
Shabi et al.

(10) Patent No.: US 11,061,827 B2
(45) Date of Patent: Jul. 13, 2021

(54) METADATA REPRESENTATION FOR ENABLING PARTIAL PAGE DUPLICATION

(71) Applicant: EMC IP Holding Company LLC, Hopkinton, MA (US)

(72) Inventors: Uri Shabi, Tel Mond (IL); Alex Soukhman, Raanana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/668,342

(22) Filed: Oct. 30, 2019

(65) Prior Publication Data
US 2021/0133117 A1    May 6, 2021

(51) Int. Cl.
*G06F 12/00* (2006.01)
*G06F 12/126* (2016.01)
*G06F 12/1018* (2016.01)

(52) U.S. Cl.
CPC ........ *G06F 12/126* (2013.01); *G06F 12/1018* (2013.01); *G06F 2212/1044* (2013.01)

(58) Field of Classification Search
CPC ............... G06F 12/126; G06F 12/1018; G06F 2212/1044
See application file for complete search history.

(56) References Cited

U.S. PATENT DOCUMENTS

| | | | |
|---|---|---|---|
| 8,190,850 B1* | 5/2012 | Davenport | G06F 16/10 711/202 |
| 2010/0199065 A1* | 8/2010 | Kaneda | G06F 3/0659 711/209 |
| 2016/0239234 A1* | 8/2016 | Berger | G06F 3/0665 |

* cited by examiner

*Primary Examiner* — Arvind Talukdar
(74) *Attorney, Agent, or Firm* — Daly, Crowley, Mofford & Durkee, LLP (57) ABSTRACT

An aspect includes providing a metadata structure having a logical level that points to a virtual level and a physical level to which the virtual level points. The method also includes storing, at the virtual level, a reference counter for each of a plurality of virtual-level type storage address entries in the metadata structure, and providing a pointer in the metadata structure between each pair of a number of pairs of virtual level address entries in which corresponding pages share a set of common sectors. The reference counter tracks a number of instances in which a corresponding pointer points to a corresponding virtual level address entry. An aspect further includes storing a single instance of the common sectors at the physical level.

18 Claims, 6 Drawing Sheets

METADATA REPRESENTATION FOR ENABLING PARTIAL PAGE DUPLICATION

BACKGROUND

Data optimization techniques reduce system administration and storage overhead costs. One optimization technique is deduplication in which a system eliminates duplicate data across a file system to increase storage, transmission speed, and processing efficiency. Data sent to a storage system can be segmented in fixed- or varying-sized segments in which each segment is provided with an identifier, such as a hash signature or hash of data. Once the identifier is generated it is used to determine if the data segment already exists in the system. If it does, it does not need to be stored again. While data deduplication techniques save on storage space, it can involve overhead costs such as increases in input/output (IO) access overhead metadata complexity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to embodiments, a method is provided. The method includes providing a metadata structure having multiple levels of indirection of data storage. The multiple levels of indirection include a logical level that points to a virtual level, and a physical level to which the virtual level points. The method also includes storing, at the virtual level, a reference counter for each of a plurality of virtual-level type storage address entries in the metadata structure, and providing a pointer in the metadata structure between each pair of a number of pairs of virtual level address entries in which corresponding pages share a set of common sectors. The reference counter tracks a number of instances in which a corresponding pointer points to a corresponding virtual level address entry. The method further includes storing a single instance of the common sectors at the physical level.

According to embodiments, a system is provided. The system includes a memory comprising computer-executable instructions and a processor executing the computer-executable instructions, the computer-executable instructions when executed by the processor cause the processor to perform operations. The operations include providing a metadata structure having multiple levels of indirection of data storage. The multiple levels of indirection include a logical level that points to a virtual level, and a physical level to which the virtual level points. The operations also include storing, at the virtual level, a reference counter for each of a plurality of virtual-level type storage address entries in the metadata structure, and providing a pointer in the metadata structure between each pair of a number of pairs of virtual level address entries in which corresponding pages share a set of common sectors. The reference counter tracks a number of instances in which a corresponding pointer points to a corresponding virtual level address entry. The operations also include storing a single instance of the common sectors at the physical level.

According to embodiments, a computer program product is provided. The computer program product is embodied on a non-transitory computer readable medium, the computer program product including instructions that, when executed by a computer, causes the computer to perform operations. The operations include providing a metadata structure having multiple levels of indirection of data storage. The multiple levels of indirection include a logical level that points to a virtual level, and a physical level to which the virtual level points. The operations also include storing, at the virtual level, a reference counter for each of a plurality of virtual-level type storage address entries in the metadata structure, and providing a pointer in the metadata structure between each pair of a number of pairs of virtual level address entries in which corresponding pages share a set of common sectors. The reference counter tracks a number of instances in which a corresponding pointer points to a corresponding virtual level address entry. The operations also include storing a single instance of the common sectors at the physical level.

BRIEF DESCRIPTION OF THE DRAWINGS

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. The following description includes a number of terms for which the definitions are generally known in the art. However, the following glossary definitions are provided to clarify the subsequent description and may be helpful in understanding the specification and claims.

As used herein, the term "storage system" is intended to be broadly construed so as to encompass, for example, private or public cloud computing systems for storing data as well as systems for storing data comprising virtual infrastructure and those not comprising virtual infrastructure. As used herein, the terms "client," "host," and "user" refer, interchangeably, to any person, system, or other entity that uses a storage system to read/write data, as well as issue requests for configuration of storage units in the storage system. In some embodiments, the term "storage device" may also refer to a storage array including multiple storage devices. In certain embodiments, a storage medium may refer to one or more storage mediums such as a hard drive, a combination of hard drives, flash storage, combinations of flash storage, combinations of hard drives, flash, and other storage devices, and other types and combinations of computer readable storage mediums including those yet to be conceived. A storage medium may also refer both physical and logical storage mediums and may include multiple level of virtual to physical mappings and may be or include an image or disk image. A storage medium may be computer-readable, and may also be referred to herein as a computer-readable program medium. Also, a storage unit may refer to any unit of storage including those described above with respect to the storage devices, as well as including storage volumes, logical drives, containers, or any unit of storage exposed to a client or application. A storage volume may be a logical unit of storage that is independently identifiable and addressable by a storage system.

In certain embodiments, the term "IO request" or simply "IO" may be used to refer to an input or output request, such as a data read or data write request or a request to configure and/or update a storage unit feature. A feature may refer to any service configurable for the storage system.

In certain embodiments, a storage device may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN) (also referred to herein as storage array network (SAN)).

In certain embodiments, a storage array (sometimes referred to as a disk array) may refer to a data storage system that is used for block-based, file-based or object storage, where storage arrays can include, for example, dedicated storage hardware that contains spinning hard disk drives (HDDs), solid-state disk drives, and/or all-flash drives. Flash, as is understood, is a solid-state (SS) random access media type that can read any address range with no latency penalty, in comparison to a hard disk drive (HDD) which has physical moving components which require relocation when reading from different address ranges and thus significantly increasing the latency for random IO data.

In certain embodiments, a data storage entity and/or storage unit may be any one or more of a file system, object storage, a virtualized device, a logical unit, a logical unit number, a logical volume, a logical device, a physical device, and/or a storage medium.

In certain embodiments, a logical unit (LU) may be a logical entity provided by a storage system for accessing data from the storage system, and as used herein a logical unit is used interchangeably with a logical volume. In many embodiments herein, a LU or LUN (logical unit number) may be used interchangeable for each other. In certain embodiments, a LUN may be a logical unit number for identifying a logical unit; may also refer to one or more virtual disks or virtual LUNs, which may correspond to one or more Virtual Machines. In certain embodiments, a volume refers to a unit of storage on a disk.

In certain embodiments, a storage cluster may refer to a type of configuration that enables stretched clusters (e.g., clusters distributed across different geographic locations). Storage cluster configurations enable entities to provide load balancing and migrations between data centers.

In certain embodiments, Log Structured Storage (LSS) refers to a file system in which data and metadata are written sequentially to a circular buffer, called a log. Log-structured file systems reclaim free space from the tail of the log to prevent the file system from becoming full when the head of the log wraps around to meet it. The tail can release space and move forward by skipping over data for which newer versions exist farther ahead in the log. If there are no newer versions, then the data is moved and appended to the head.

In certain embodiments, a Data Reduction Ratio (DRR) is a measure of the effectiveness of data reduction. DRR reflects the ratio of the size of data ingested to the size of the data stored. The size of stored data may be the amount of usable storage capacity consumed by the data.

While vendor-specific terminology may be used herein to facilitate understanding, it is understood that the concepts, techniques, and structures sought to be protected herein are not limited to use with any specific commercial products. In addition, to ensure clarity in the disclosure, well-understood methods, procedures, circuits, components, and products are not described in detail herein.

The phrases, "such as," "for example," "e.g.," "exemplary," and variants thereof, are used herein to describe non-limiting embodiments and are used herein to mean "serving as an example, instance, or illustration." Any embodiments herein described via these phrases and/or variants are not necessarily to be construed as preferred or advantageous over other embodiments and/or to exclude the incorporation of features from other embodiments. In addition, the word "optionally" is used herein to mean that a feature or process, etc., is provided in some embodiments and not provided in other embodiments." Any particular embodiment of the invention may include a plurality of "optional" features unless such features conflict.

In deduplication processes, levels of indirection with respect to storage addressing may be used to translate or map between layers of storage space: (i) first-level mappings that contain pointers to data, (ii) second-level mappings that contain pointers to the first-level mappings, and (iii) third-level mappings contain pointers to the second-level mappings. The third level can be logical block address space (LBA), the second level can be virtual block address space (VLB), and the first level can be a physical address space (PLB). Each of these address spaces reflect a range of addresses. The mapping can be implemented using a data structure that takes a logical address and uses a pointer to point to a VLB address, which in turn points to a physical address (PLB) in which certain data (e.g., such as a page) resides. Current methods are not scalable as, e.g., a virtual block address space level (VLB) has a one-to-one correspondence with an associated physical address space (e.g., the pointer points to a single physical block) to generate data from a physical page. If it is a full page, deduplication is a simple process, as the deduplication can be performed on the entire page. Challenges arise when a deduplication operation is to be performed on a partial page (e.g., when page x at physical address 1 differs by a few bytes from page y at physical address 2). It is undesirable and costly to save two instances of the page. The embodiments described herein provide a technique for enabling partial deduplication through an enhanced metadata structure.

The enhanced metadata data structure of the embodiments described herein identifies what is needed to construct common data between two pages. A mapper associated with the logical address space (LBA) has no information about the nature of the data in the page. Embodiments provide a hash table that includes information about every virtual block address (VLB), and a hash is generated and inserted into the hash table. For every hash (key) in the system, there is a corresponding value (VLB) in the hash table. Hashes can be grouped into buckets. When a new page is received, a hash is calculated from the page and the system performs a lookup in a hash table for a possible match of the hash in the table. If there is no match, then the page is added to the hash table. In addition, a reference count is used to perform deduplication and is maintained at the VLB level. It is increased to reflect any additional pointer pointing to the VLB. There are many ways to represent a mapper to implement these features. In the embodiments described herein a page (e.g., 4K) contains a mapper for VLB pointers which means that a pointer from, e.g., leaf to VLB is built from two sections: a pointer to the page and a pointer to the specific entity within the page.

Figure 1:
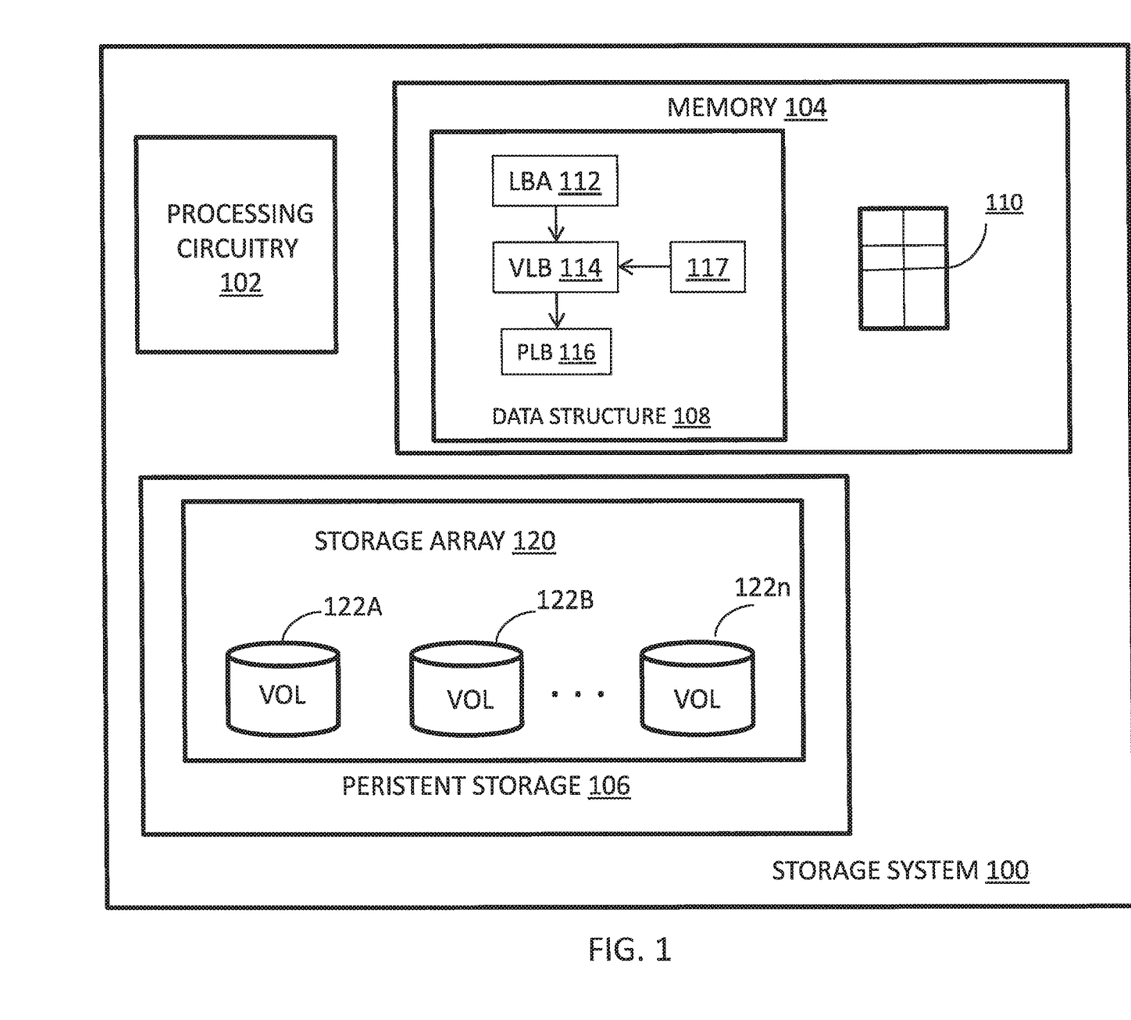
FIG. 1 is a diagram of an example of a storage system according to embodiments.

Turning now to FIG. 1, a system 100 for implementing an enhanced metadata structure for enabling partial duplication of data in a storage system environment will now be described in accordance with embodiments. The storage system 100 of FIG. 1 includes processing circuitry 102, memory 104, and persistent storage 106. In an embodiment, the persistent storage 106 may be locally installed within the storage system 100, as shown in FIG. 1, or may be an external or remote device that is communicatively coupled to the storage system 100 via a connection (not shown).

If the persistent storage 106 is remote, it may be coupled to the storage system via known connections, interfaces and network circuitry, e.g., Ethernet cables, Wireless Fidelity (Wi-Fi) wireless connections, an IP network, SCSI cables, SATA cables, Fibre Channel (FC) cables, etc. If the connection is a network connection, then interfaces and network circuitry may include, for example, one or more Ethernet cards, cellular modems, FC adapters, Wi-Fi wireless networking adapters, and/or other devices for connecting to a network. If the connection to the persistent storage is a local storage connection, then interface and/or network interface circuitry may include for example, SCSI, SAS, ATA, SATA, FC, and/or other similar controllers and ports.

The persistent storage 106 may include any kind of persistent storage devices, such as, for example, hard disk drives, solid-state storage devices, flash drives, etc. Persistent storage 106 stores user data as volumes 122A-122n, which represents one or more logical disks accessible by users. Volumes 122A-122n are organized and managed with reference to metadata that is stored within various data structures, such as metadata structure 108 in memory 104. The metadata structure 108 is described further herein. As shown in FIG. 1, by way of non-limiting example, the persistent storage is implemented via a storage array 120. While the unit of data storage is described herein as volumes in a storage array, it is understood that other units of data storage or object storage may be employed to realize the advantages of the embodiments.

The memory 104 may be any kind of digital system memory, such as, for example, random access memory (RAM). Memory 104 stores an operating system (OS, not depicted) in operation (e.g., a Linux, UNIX, Windows, MacOS, or similar operating system). Memory 104 may also store an input/output (I/O) stack (not shown). The I/O stack allows I/O requests (not depicted) from external hosts (as well as local applications) to be processed with respect to the volume data 122A-122n managed by the storage system 100.

The storage system includes processing circuitry 102, which may be any kind of processor or set of processors configured to perform operations, such as, for example, a microprocessor, a multi-core microprocessor, a digital signal processor, a system on a chip, a collection of electronic circuits, a similar kind of controller, or any combination of the above. It will be understood that the storage system 100 may also include other components as are well-known in the art, including interconnection circuitry. In operation, processing circuitry 102 may execute one or more application, which may be implemented in logic executable by the processing circuitry.

The processing circuitry 102 is configured to receive and service input/output (IO) requests from one or more external or remote systems (not shown) that are communicatively coupled to the storage system 100. The coupling may be implemented via any type of communication network, such as Internet, local area network, wide area network, and may include wireline and/or wireless technology.

The volumes 122A-122n may be addressable via logical addresses that are mapped to corresponding physical addresses of the array 120 through a three-level indirection scheme, such as the scheme referenced above, and is used to perform address translation during read and write operations with respect to the array.

In embodiments, the partial page deduplication techniques utilize a Log Structured Storage (LSS) system having a three-level indirection scheme to access user data. As shown in the metadata structure 108 of FIG. 1, the three level scheme includes a logical block address (LBA) level 112 (i.e., leaf level), a virtual block (VLB) level 114, and a physical block (PLB) level 116. The leaf is a logical block address (LBA) representation layer that is generally organized as a tree where each leaf corresponds to a specific LBA range. The VLB layer isolates the LBA layer from physical storage and encapsulates the physical location of the user data and allows data relocation without the necessity to update the leaf. This layer includes data for the physical page location, the size of the page, a reference count, and a hash of the page. In log-structured storage systems, the data is stored in contiguous chunks of data, which is referred to as PLB (e.g., 2 MB chunks). The actual user data pages reside inside the PLB and are referenced by the VLB.

The VLB layer is particularly useful in cases of deduplication where a certain page is duplicated multiple times across the logical space (within a single volume or multiple volumes). In such a case, a single VLB entry is pointed to by multiple logical addresses. As it represents a single page on disk, deduplication for the page is not performed.

Deduplication may be implemented using a unique hash representing a page. The system 100 of FIG. 1 includes the hash table 110 in memory 104 that represents most hashes. As indicated above, the hash table 110 includes information about every virtual block address (VLB). Hashes of pages are generated and inserted into the hash table. For every hash (key) in the system, there is a corresponding value (VLB) in the hash table. Hashes can be grouped into buckets. When a new page is received, a hash is calculated from page and the system performs a lookup in a hash table for a possible match of the hash in the table.

A partial page match occurs when a subpage (e.g., few sectors of the page) match as between two pages (e.g., part of the pages are unique and part of the pages are in common).

Figure 2:
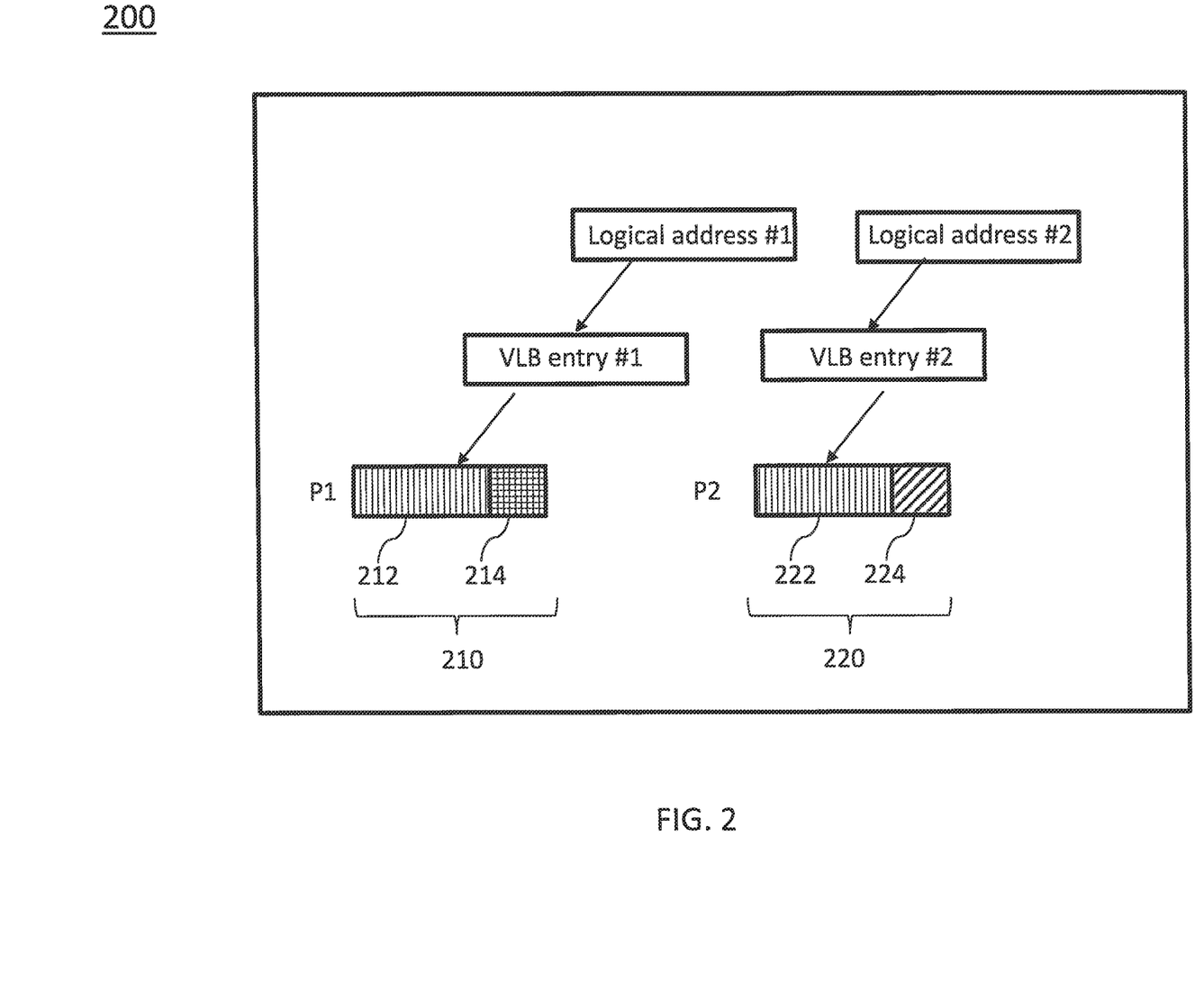
FIG. 2 is a diagram depicting an example metadata data structure.

As an example, a logical representation of metadata in a data structure 200 for two partial matching pages P1 and P2 (210 and 220, respectively) in a cluster for which full page deduplication is performed is shown in FIG. 2. As shown in FIG. 2, the two pages P1 and P2 (i.e., a full instance of page P1 and a full instance of page P2) are maintained separately of one another (i.e., no common part of the pages is maintained by the system). The common part of the pages (i.e., representing identical data) is shown as 212 and 222. The page P1 also contains data 214 which is not in common with P2. Likewise, the page P2 contains data 224 that is not in common with page P1. Thus, the data stored in part of the page P1 (214) is not a duplicate of the part of the data stored in P2 (224). In the metadata structure 200 of FIG. 2, for page P1 (210), a logical address #1 for the page points to a VLB entry #1, which in turns points to the page P1. Also in the metadata structure 200 of FIG. 2, for page P2 (220), a logical address #2 for the page points to a VLB entry #2, which in turn points to the page P2. This metadata structure 200 is sub-optimal in terms of capacity as the common part of the pages (i.e., 212 and 222) is stored twice.

Figure 3:
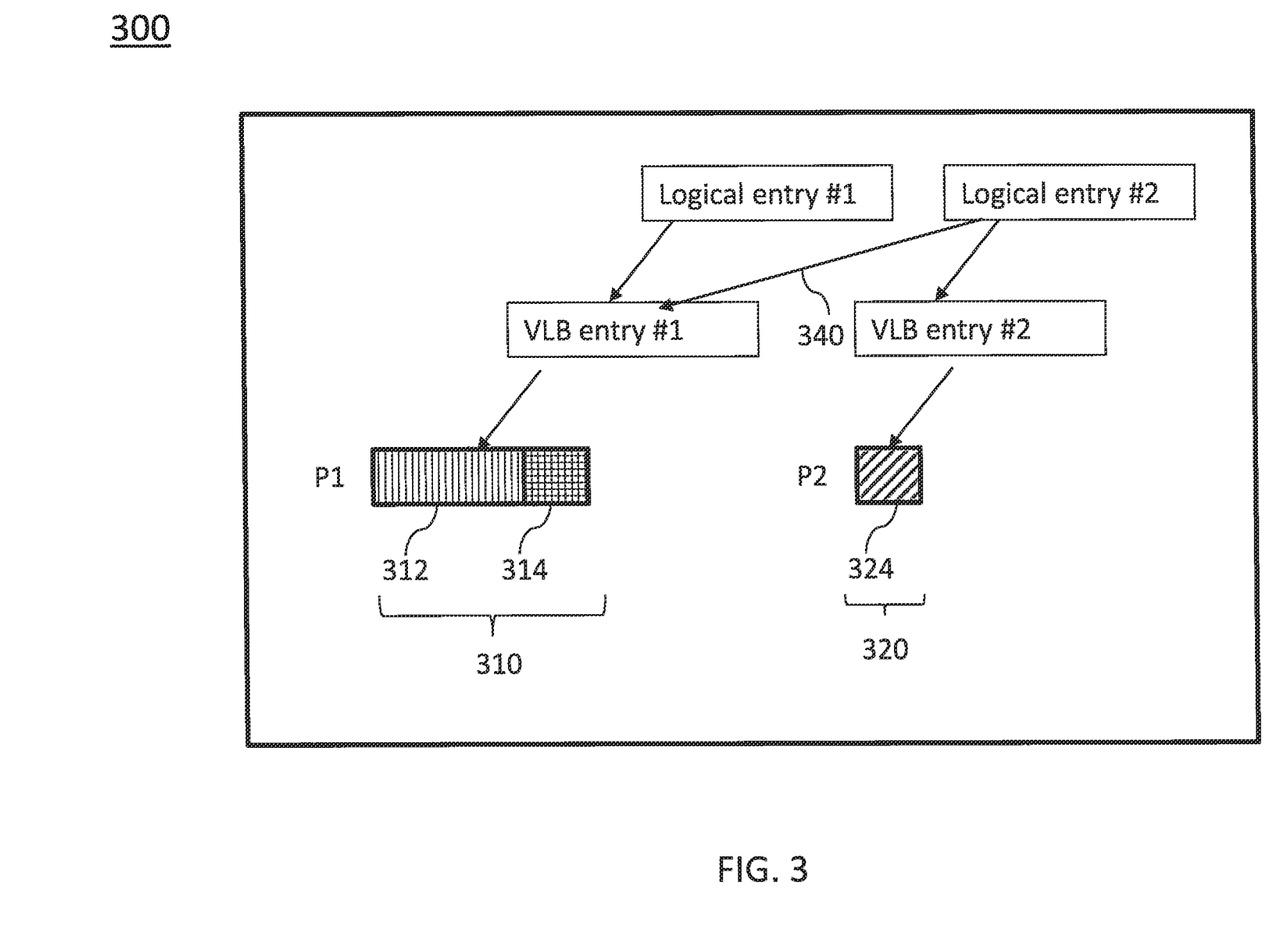
FIG. 3 is a diagram depicting another example metadata data structure.

In a system that supports partial match deduplication, the same case may be presented as shown in a metadata structure 300 of FIG. 3. In FIG. 3, the pages P1 and P2 correspond to the same pages P1 and P2 in FIG. 2. In the metadata structure 300 of FIG. 3, for page 310, a logical entry #1 points to a VLB entry #1, which in turn points to page P1 (310). A logical entry #2 includes two pointers: a first pointer 340 points to the VLB entry #1 to reflect the common page data (312/222) between pages P1 and P2 as well as the unique data 314 to P1, and a second pointer points to a VLB entry #2 to reflect the unique portion of page P2 (324). Thus, the VLB entry #2 points to the partial page 324, which is not in common with page P1, and the partial page 324 corresponds to the partial page 224 of FIG. 2, the partial page 314 of page P1 corresponds to the partial page 214 of FIG. 2, and the common page data 312 corresponds to the common page data 212/222 of FIG. 2.

This metadata data structure 300 and process of using the structure for deduplication improves capacity as it is capable of deduplicating partial pages (e.g., 312/222). However, there are drawbacks. For instance, a hash value of the page is typically represented by the VLB but there is no single VLB representing the page, which may reduce future deduplication of full aligned pages.

If page P2 is repeatedly written over time, such implementation may be sub-optimal as each new page P2 write operation produces additional VLB entries as well as the partial page P2 sub-page. It is typically desirable to avoid saving a back pointer (e.g., back pointer 340 of VLB #1 to LBA #2); however, fixing this scenario can be complex and costly in terms of CPU cycles.

The techniques for performing partial deduplication overcome the aforementioned challenges by providing a metadata structure and deduplication process that accounts for partial page deduplication by pointing from one VLB entry to another VLB entry for pages that share common data. An example of this is shown in FIG. 4.

As indicated above, the hash table (e.g., table 110 of FIG. 1) includes a list of keys (hashes representing a page) and values (e.g., a VLB where the page is stored). The VLBs of an enhanced metadata structure in the embodiments described herein contain pointers to corresponding physical pages and a reference count that represents the number of other VLBs/leafs pointing to the page. The system is unaware of which VLB points to another VLB. The system only knows the reference count value for the VLB, which will be greater than zero as long as at least one pointer points to it. Once the reference count is reduced to zero, this means that there is no pointer and the entry can be removed.

Figure 4:
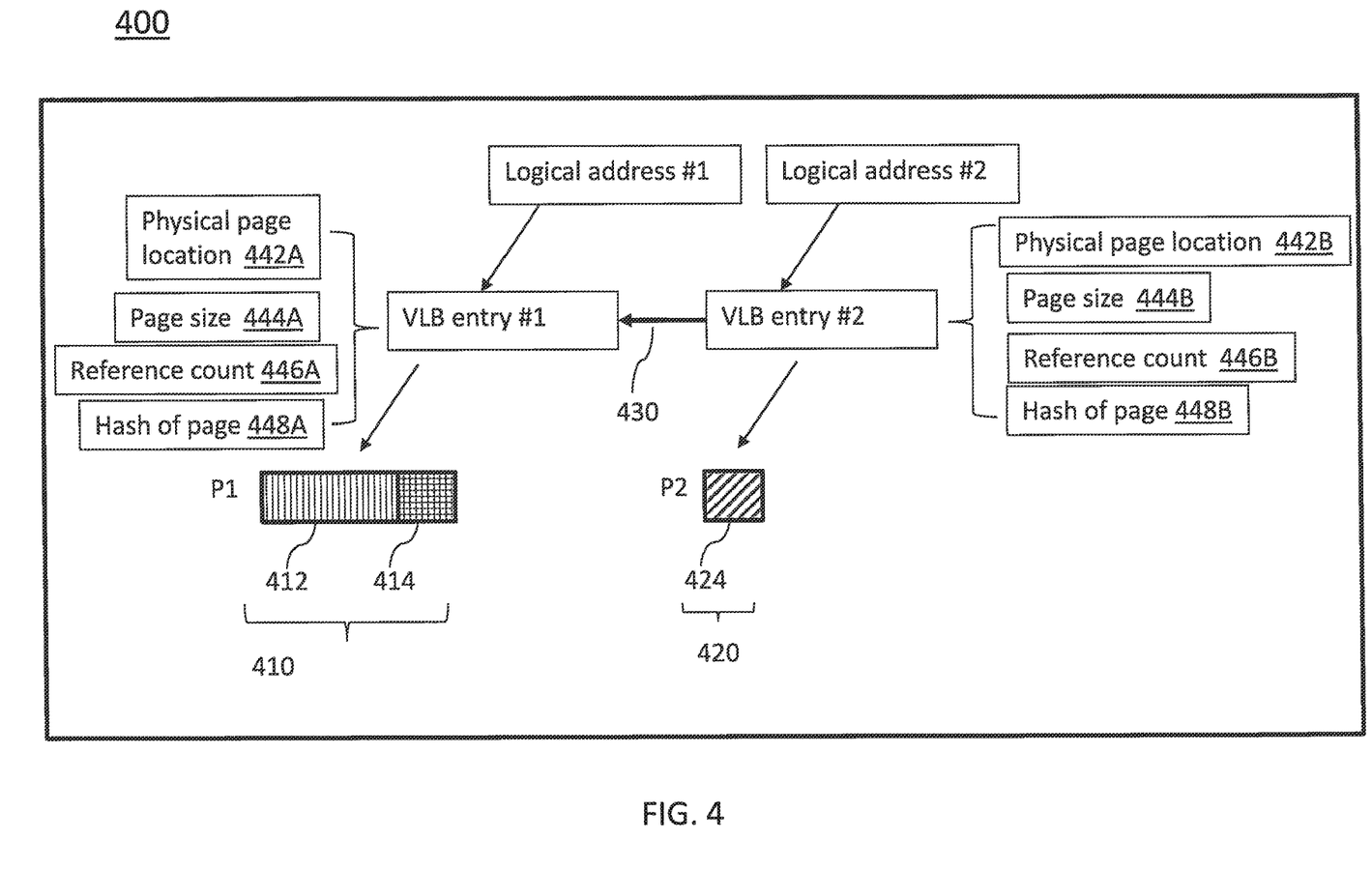
FIG. 4 is a diagram depicting another example metadata data structure according to embodiments.

Turning now to FIG. 4, an enhanced metadata data structure 400 for implementing partial deduplication in a storage environment will now be described. The metadata structure 400 corresponds to the metadata structure 108 shown in FIG. 1. As shown in FIG. 4, a second pointer (e.g., shown as pointer 340 in FIG. 3) is removed from the structure 400. Instead, a pointer 430 points from the VLB entry #2 to the VLB entry #1. This removes the physical implementation complexity from the logical layer (e.g., logical addresses #1 and #2).

As shown in the structure 400 of FIG. 4, each VLB entry includes various elements that include corresponding physical page locations 442A-442B, page sizes 444A-44B, reference count 446A-446B, and hash value of the page 448A-448B.

The VLB pointed to by a logical address and a second VLB is responsible for the page where part of the page (i.e., the unique portion) remains the responsibility of another VLB. As shown in FIG. 4, for example, the VLB entry #2 pointed to by the logical address #2 is the entry which will be responsible for the physical page 420 even if part of the page (e.g., the non unique portion 412) is in the responsibility of a different VLB (VLB #1). This means the system gains back the hash of the complete page with respect to the VLB #2 that is not responsible for the entire page, as well as the reference count for the complete page.

Since the system has a hash for the complete page, it can point to this VLB entry from other logical addresses (e.g., dedupe full pages that are partially deduped).

If needed, there can be many dedupes to page P2 improving P2's representation (e.g., into a single page), and this can be easily implemented during the garbage collection phase where VLB entry #2 is changed to represent a full page (e.g., 4K page).

Figure 5:
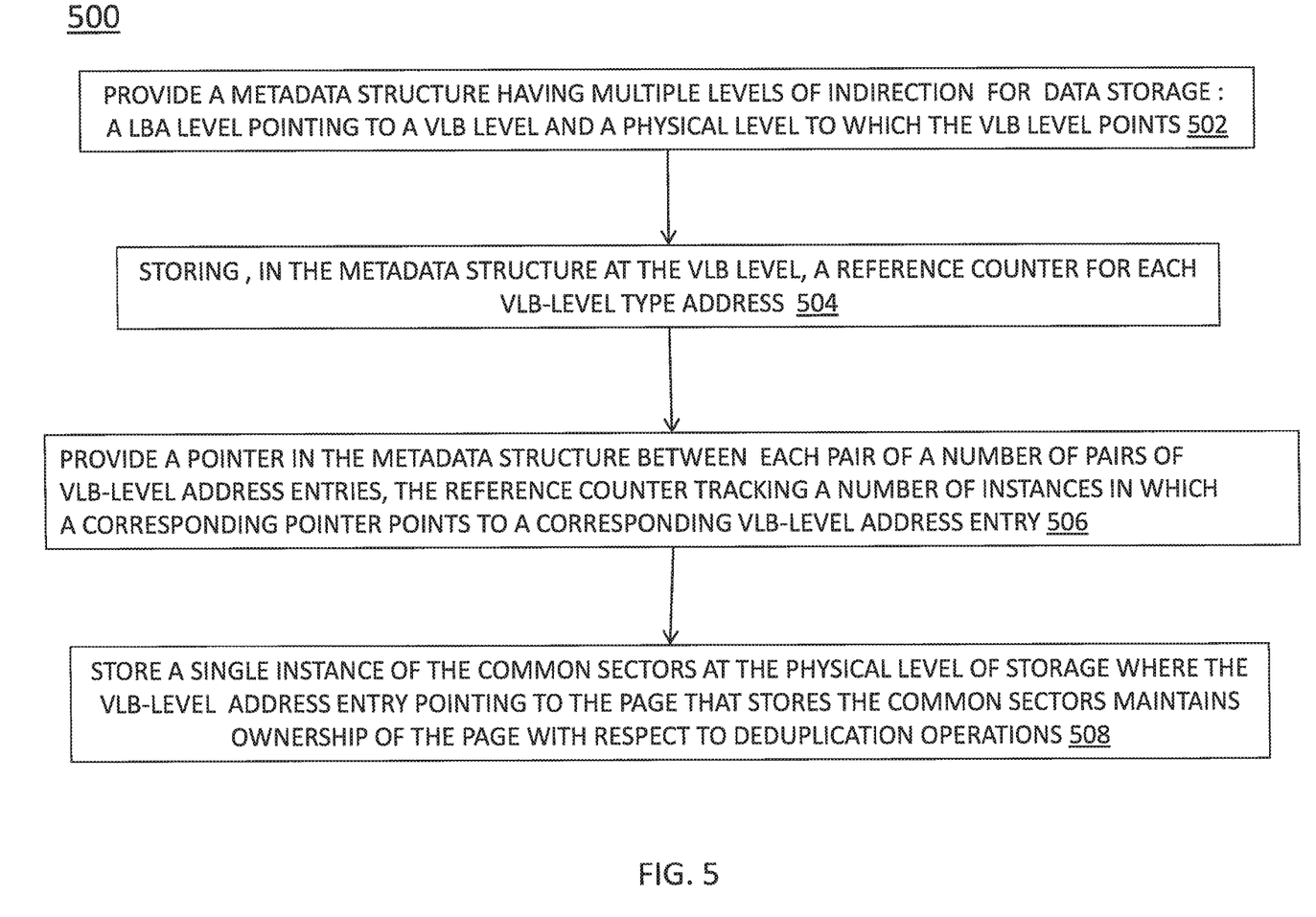
FIG. 5 is a flowchart of a process according to embodiments.

Turning now to FIG. 5, a process 500 for building the enhanced metadata structure for use in partial page deduplication will now be described in accordance with embodiments. In block 502, the process 500 provides a metadata structure having multiple levels of indirection of data storage. The multiple levels of indirection include a logical level that points to a virtual level, and a physical level to which the virtual level points. In embodiments, the logical level may include a logical address layer (LBA), the virtual level may include a virtual address layer (VLB), and the physical level may include a physical layer (PLB).

In block 504, the process 500 stores, at the virtual level of storage, a reference counter for each of a plurality of virtual-level type storage address entries in the metadata structure.

In block 506, the process 500 provides a pointer in the metadata structure 400 between each pair of a number of pairs of virtual level address entries in which corresponding pages share a set of common sectors. The reference counter tracks a number of instances in which a corresponding pointer points to a corresponding virtual level address entry.

Figure 6:
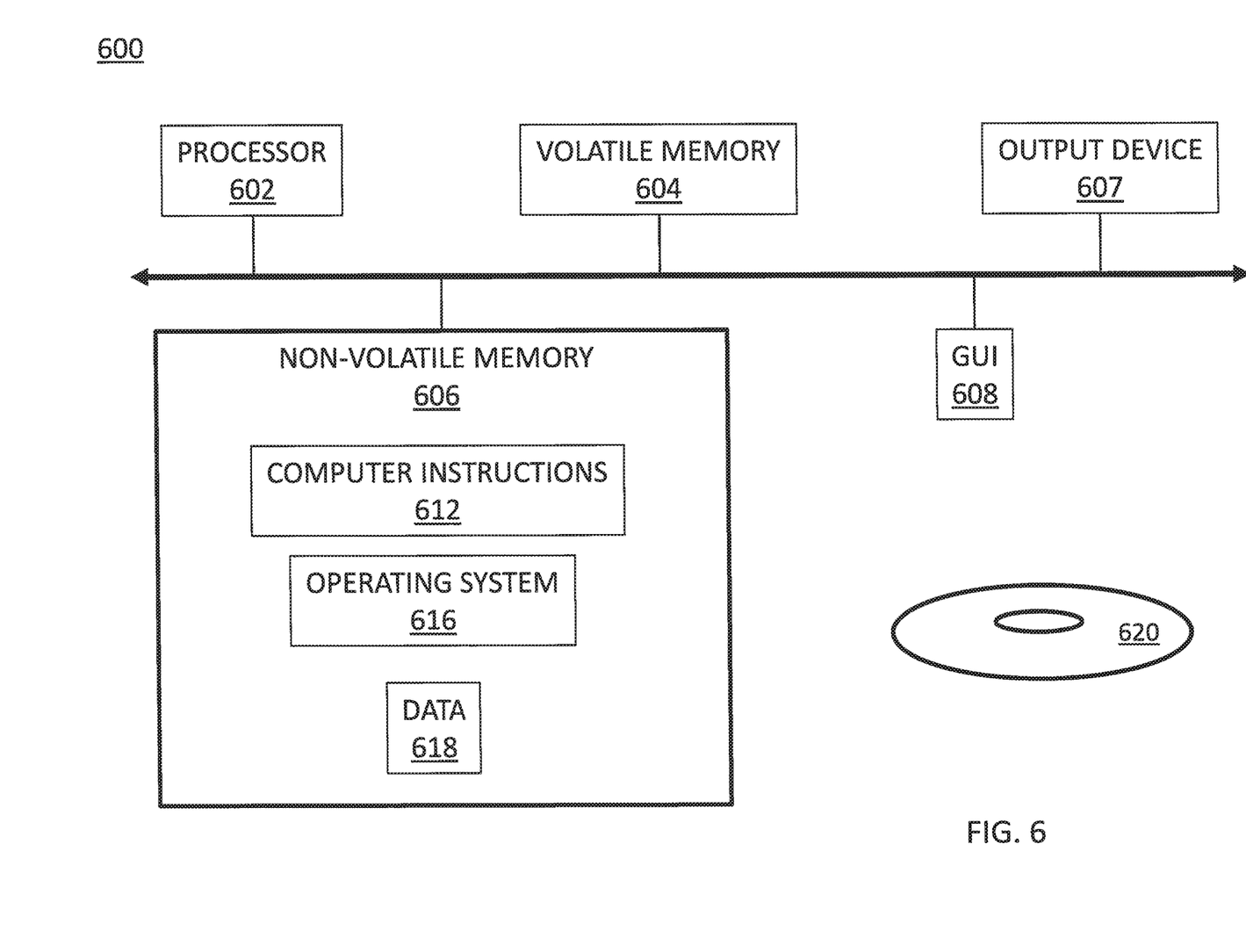
FIG. 6 is a diagram of an example of a computing device according to embodiments.

In block 508, the process 500 stores a single instance of the common sectors at the physical level. The virtual level address entry points to the page that stores the common sectors and maintains ownership of the page with respect to deduplication operations. The virtual level address entry also points to the physical address of the unique portion of the page FIG. 6 shows an exemplary computer 600 (e.g., physical or virtual) that can perform at least part of the processing described herein. The computer 600 includes a processor 602, a volatile memory 604, a non-volatile memory 606 (e.g., hard disk or flash), an output device 607 and a graphical user interface (GUI) 608 (e.g., a mouse, a keyboard, a display, for example). The non-volatile memory 606 stores computer instructions 612, an operating system 616 and data 618. In one example, the computer instructions 612 are executed by the processor 602 out of volatile memory 604. In one embodiment, an article 620 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to the disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

The invention claimed is:

1. A method, comprising:
providing a metadata structure having multiple levels of indirection of data storage, the multiple levels of indirection including a logical level that points to a virtual level, and a physical level to which the virtual level points;
storing, at the virtual level, a reference counter for each of a plurality of virtual-level type storage address entries in the metadata structure;
providing a pointer in the metadata structure between each pair of a number of pairs of virtual level address entries in which corresponding pages share a set of common sectors, the pointer indicating a partial match between the corresponding pages, the partial match occurring when the set of common sectors includes fewer than all sectors in any of the corresponding pages,
wherein the reference counter tracks a number of instances in which a corresponding pointer points to a corresponding virtual level address entry; and
storing a single instance of the common sectors at the physical level.

2. The method of claim 1, wherein a virtual-level type storage address entry that points to the page that stores the common sectors maintains ownership of the page with respect to deduplication operations.

3. The method of claim 2, wherein a virtual-level type storage address entry that does not point to the page storing the common sectors is dependent on the virtual-level type storage address that points to the page storing the common sectors.

4. The method of claim 1, further comprising:
storing, in a hash table, a listing of the virtual-level type storage addresses and hashed values for pages corresponding to the virtual-level type storage addresses.

5. The method of claim 4, wherein the virtual-level type storage addresses point to a physical-level type storage address at the physical level in which data is stored.

6. The method of claim 1, wherein when the reference count for the virtual-level type storage address of the matching page is not equal to zero, the method includes performing a partial deduplication operation.

7. A system comprising:
a memory comprising computer-executable instructions; and
a processor executing the computer-executable instructions, the computer-executable instructions when executed by the processor cause the processor to perform operations comprising:
providing a metadata structure having multiple levels of indirection of data storage, the multiple levels of indirection including a logical level that points to a virtual level, and a physical level to which the virtual level points;
storing, at the virtual level, a reference counter for each of a plurality of virtual-level type storage address entries in the metadata structure;
providing a pointer in the metadata structure between each pair of a number of pairs of virtual level address entries in which corresponding pages share a set of common sectors, the pointer indicating a partial match between the corresponding pages, the partial match occurring when the set of common sectors includes fewer than all sectors in any of the corresponding pages,
wherein the reference counter tracks a number of instances in which a corresponding pointer points to a corresponding virtual level address entry; and
storing a single instance of the common sectors at the physical level.

8. The system of claim 7, wherein a virtual-level type storage address entry that points to the page that stores the common sectors maintains ownership of the page with respect to deduplication operations.

9. The system of claim 8, wherein a virtual-level type storage address entry that does not point to the page storing the common sectors is dependent on the virtual-level type storage address that points to the page storing the common sectors.

10. The system of claim 7, wherein the operations further comprise:
   storing, in a hash table, a listing of the virtual-level type storage addresses and hashed values for pages corresponding to the virtual-level type storage addresses.

11. The system of claim 10, wherein the virtual-level type storage addresses point to physical-level type storage address at the physical level in which data is stored.

12. The system of claim 7, wherein when the reference count for the virtual-level type storage address of the matching page is not equal to zero, the operations include performing a partial deduplication operation.

13. A computer program product embodied on a non-transitory computer readable medium, and the computer program product including instructions that, when executed by a computer, causes the computer to perform operations, the operations including:
   providing a metadata structure having multiple levels of indirection for storing data, the multiple levels of indirection including a logical level that points to a virtual level, and a physical level to which the virtual level points;
   storing, at the virtual level, a reference counter for each of a plurality of virtual-level type storage address entries in the metadata structure;
   providing a pointer in the metadata structure between each pair of a number of pairs of virtual level address entries in which corresponding pages share a set of common sectors, the pointer indicating a partial match between the corresponding pages, the partial match occurring when the set of common sectors includes fewer than all sectors in any of the corresponding pages,
   wherein the reference counter tracks a number of instances in which a corresponding pointer points to a corresponding virtual level address entry; and
   storing a single instance of the common sectors at the physical level.

14. The computer program product of claim 13, wherein the virtual level address entry that points to the page that stores the common sectors maintains ownership of the page with respect to deduplication operations.

15. The computer program product of claim 14, wherein a virtual-level type storage address entry that does not point to the page storing the common sectors is dependent on the virtual-level type storage address that points to the page storing the common sectors.

16. The computer program product of claim 13, wherein the operations further include:
   storing, in a hash table, a listing of the virtual-level type storage addresses and hashed values for pages corresponding to the virtual-level type storage addresses.

17. The computer program product of claim 16, wherein the virtual-level type storage addresses point to physical-level type storage address in which data is stored.

18. The computer program product of claim 13, wherein when the reference count for the virtual-level type storage address of the matching page is not equal to zero, the operations further comprise performing a partial deduplication operation.

* * * * *